April 18, 1933.     D. L. CONKLIN     1,904,356
DISPLAY GREASE CHART
Filed June 9, 1932
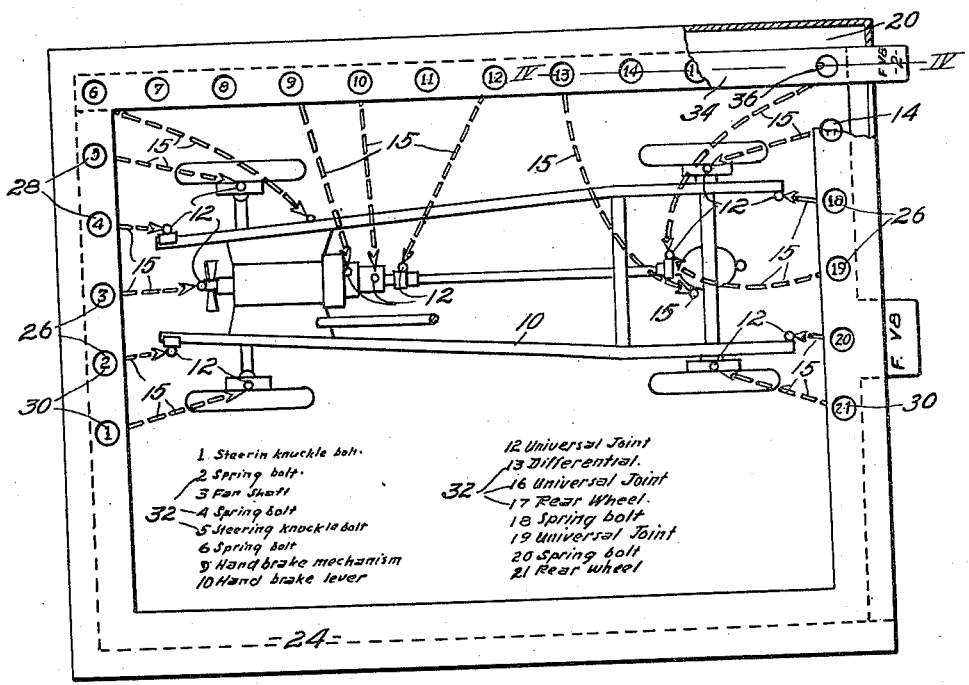
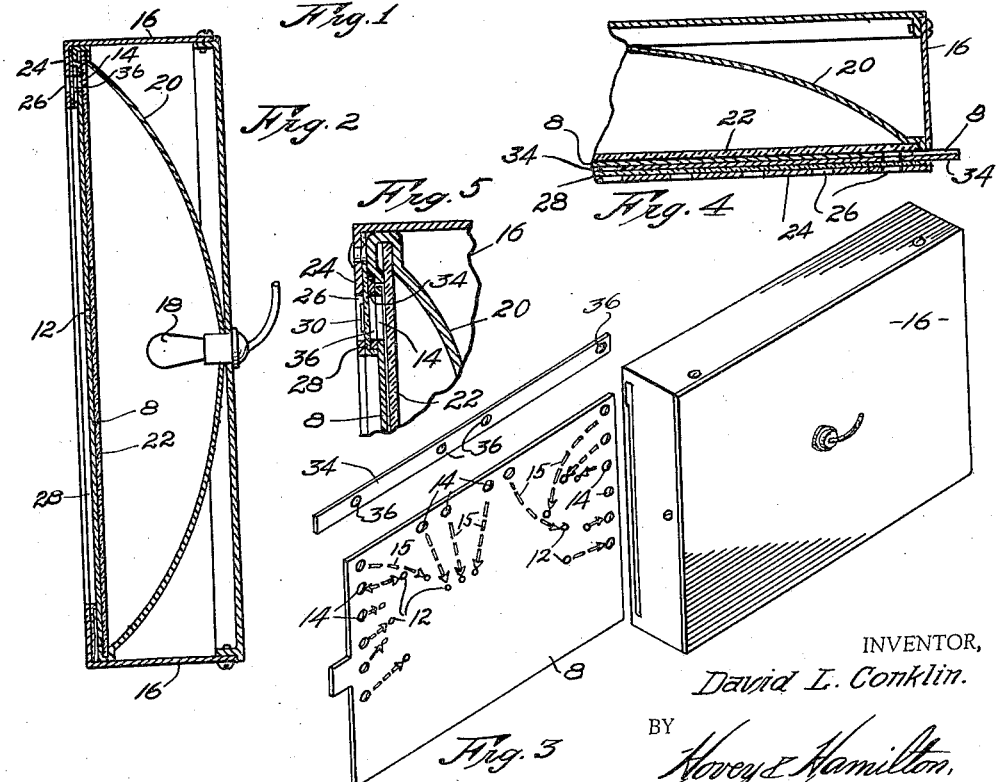
INVENTOR,
David L. Conklin.
BY Hovey & Hamilton,
ATTORNEYS.

Patented Apr. 18, 1933

1,904,356

UNITED STATES PATENT OFFICE

DAVID L. CONKLIN, OF INDEPENDENCE, MISSOURI, ASSIGNOR OF ONE-THIRD TO FRED O. TRUE, OF KANSAS CITY, MISSOURI

DISPLAY GREASE CHART

Application filed June 9, 1932. Serial No. 616,179.

This invention relates to indicating devices or charts adapted to convey information with regard to the points on an automobile that are to be serviced, and the primary object of the invention is to provide equipment of this character that may be quickly adjusted for the purpose of clearly setting forth exactly the number and position of lubricating points which are to be given attention on any make or model of automobile.

One of the important objects of the instant invention is the contemplation of a display chart for lubricating service stations which includes a number of related parts all having apertures formed therethrough and designed to be brought into juxtaposition for the purpose of allowing light to pass through certain of said apertures and for closing certain other of the apertures whereby is indicated exactly the points on any make of automobile that are to be lubricated.

Still further object of this invention is the provision of a greasing chart that is extremely simple in construction; is inexpensive to manufacture; is quickly adaptable for use in connection with any model of automobile; and is equipped with means for selectively indicating any one of a series of groups of lubricating points on any model of automobile.

Many minor objects of this invention, including details of construction as they appear in one form of the invention will appear in the following specifications referring to the accompanying drawing, wherein:

Figure 1 is a broken-away face view of a lubricating chart embodying the features of the present invention.

Fig. 2 is a vertical cross section through the same, taken on line II—II of Fig. 1.

Fig. 3 is a perspective view of the parts of the chart in disassembled relation.

Fig. 4 is a fragmentary horizontal sectional view through a portion of the chart, taken on line IV—IV of Fig. 1, and, Fig. 5 is an enlarged fragmentary sectional view of a portion of the chart as illustrated in Fig. 2.

One form of a greasing chart embodying this invention is illustrated, and comprises a panel 8 upon which is printed or otherwise marked a diagram 10 of an automobile or other piece of apparatus that is to be lubricated. Panel 8 is preferably made of opaque substance having rigidity sufficient to maintain the same in a planar position so that it may be easily inserted or removed from the hereinafter described support.

Diagram 10 is complete enough to familiarize the operator with all points of lubrication, and at each of these points is formed an opening or transverse perforation 12. A series of marginal perforations 14 are created transversely through panel 8 adjacent the edge thereof, and in most cases a lead line, comprising a group of holes 15, extends from each perforation 12 to the appropriate marginal perforation 14. Obviously, light will pass through all the perforations formed through panel 8 and it is one of the features of this invention to supply a support 16 for panel 8 that includes, among other features, an illuminating means 18 in form of an ordinary electric light bulb, amplified by a reflector apron 20, which serves to evenly distribute the light entirely over the back side of panel 8 when it is in place in the support 16.

Panel 8 is slidable to and from the operative position in front of a sheet of glass or similar substance 22 that may be colored if desired.

As shown in Fig. 5, a flange 24 assists in holding panel 8 in position, and this flange, likewise, serves the important function of presenting a number of windows 26, located at appropriate points to overlie certain predetermined marginal perforations 14. A transparent or translucent sheet 28 is placed across each or all of windows 26 and upon this sheet is secured a numeral or other designation 30.

A legend 32 carried on the front of each panel that may be used with this apparatus, defines the character, type or part name of the various points of lubrication that are designated by openings 12 and, since lead lines made up of holes 15 permit ready association, it is easy to understand what part is to be lubricated and its character when the panel 8, illustrating the model of automobile being serviced, is inserted to position.

An auxiliary strip 34, having a plurality of orifices 36 formed therethrough is used with this greasing chart when but a certain number of points of lubrication are to be serviced. This strip 34 is movable to and from a position adjacent windows 26 and the location of orifices 36 govern the number of windows 26 through which pass light from bulb 18.

For example, when panel 8 is placed, some of the windows 26 will register with marginal apertures 14 while others will be closed by the opaque panel. If strip 34 is later inserted, certain additional windows may be closed, thus leaving but an accurate number of windows to designate points to be serviced by lubricating.

In operating the chart or using it to designate points to be lubricated, it is obvious that the combination of panel 8, support 16 and auxiliary strip 34 with their formed apertures are combinable to denote exactly the points to be lubricated.

The windows 26 are sufficient in number to designate the points of lubrication on any make of automobile. If certain automobiles do not have points of lubrication as others, there are simply no marginal apertures formed through the panel underlying these particular windows and, correspondingly, no number as on the closed window appears in the legend on that particular chart panel. There is always a lighted or open window for every lead line for each panel and it is only when it is desired to lubricate but a predetermined number of the points that the auxiliary strip 34 is moved to position to close some of windows 26.

This feature of the invention is especially valuable in assisting the operator to determine exactly the points to lubricate in the first, second and third classes of lubricating jobs. When the parts are in place, only the points indicated by lighted windows are serviced.

Having thus described the invention, what is claimed as new and desired to be secured by Letters Patent is:

1. A chart for use in servicing vehicles comprising in combination. a perforated panel; a support for the panel, a diagrammatic representation of a particular kind of vehicle on the panel having a portion overlying a part of said panel; windows formed through said overlying portion; and lead lines, comprising a series of holes formed through the panel, joining certain of the perforations formed through the underlying part of said panel and the exposed portion, a predetermined number of said windows being in register with some of the perforations in the underlying part of said panel.

2. A chart for use in servicing vehicles comprising, in combination, a panel having marginal and intermediate perforations formed therethrough; a diagrammatic representation of a particular kind of vehicle on the panel a support for the panel having a portion overlying said marginal perforations; windows formed through said overlying portion to register with a predetermined number of said marginal perforations and lead lines comprising a series of holes formed through the panel connecting certain of said marginal and intermediate perforations.

3. A chart for use in servicing vehicles comprising, in combination, a panel having a diagram of a particular kind of vehicle printed thereon; marginal and intermediate perforations formed through said panel; a support for the panel including means to project light through all of said perforations; means overlying all of said marginal perforations having windows formed therethrough; a predetermined number of said marginal perforations and said windows being in register; and lead lines comprising a series of holes formed through the panel connecting certain of said marginal and intermediate perforations.

4. A chart for use in servicing vehicles comprising, in combination, a panel having a diagram of a particular kind of vehicle printed thereon; marginal and intermediate perforations formed through said panel, said intermediate perforations being at predetermined points on the diagram; a support for the panel including means to project light through all of said perforations; means overlying all of said marginal perforations having windows formed therethrough, a predetermined number of said marginal perforations and said windows being in register, a number of said windows being covered by said panel to preclude the passage of light therethrough; and lead lines comprising a series of holes formed through the panel, joining certain of the marginal and intermediate perforations of said panel.

5. A chart for use in servicing vehicles comprising, in combination, a panel having a diagram of a particular kind of vehicle printed thereon; marginal and intermediate perforations formed through said panel, said intermediate perforations being at predetermined points on the diagram; a support for the panel; means overlying all of said marginal perforations having windows formed therethrough in register with a predetermined number of said marginal perforations respectively; and an auxiliary strip movable to position adjacent said registering windows and marginal perforations to close other of said windows, whereby to indicate a certain group of parts on the vehicles that are to be serviced.

6. A chart for use in servicing vehicles comprising, in combination, a panel having a diagram of a particular kind of vehicle printed thereon; marginal and intermediate perforations formed through said panel, said intermediate perforations being at predetermined points on the diagram; a support for the panel; means overlying all of said marginal perforations having windows formed therethrough in register with a predetermined number of said marginal perforations respectively; and an auxiliary strip having orifices therethrough in register with some of said windows whereby to indicate a certain group of parts on the vehicle that are to be serviced.

7. In a chart for use in servicing vehicles, a panel of opaque substance having a diagram of a particular kind of vehicle imprinted thereon; marginal perforations formed through said panel; a support for the panel having a flange overlying said marginal perforations and creating a frame for said diagram; a group of intermediate perforations through said panel at certain points on the diagram and within the confines of said frame; windows formed through said flange in register with certain of said marginal, perforations; and lead lines, comprising holes formed through the panel, extending from each intermediate perforation respectively to the inner edge of the frame adjacent the appropriate respective window.

8. In chart for use in servicing vehicles, a panel of opaque substance having a diagram of a particular kind of vehicle imprinted thereon; marginal perforations formed through said panel; a support for the panel having a flange overlying said marginal perforations and creating a frame for said diagram; a group of intermediate perforations through said panel at certain points on the diagram and within the confines of said frame; windows formed through said flange in register with certain of said marginal perforations; lead lines, comprising holes formed through the panel, extending from each intermediate perforation respectively to the inner edge of the frame adjacent the appropriate respective window; and an auxiliary strip, movable to and from a position adjacent said windows and perforations, having orifices therethrough to selectively close certain of said windows, whereby to indicate, by the open windows, a certain group of parts on the vehicle that are to be serviced.

9. In a chart for use in servicing vehicles, a panel of opaque substance having a diagram of a particular kind of vehicle printed thereon; marginal perforations formed through said panel; intermediate perforations through said panel to designate certain points on said diagram; a support for the panel having a flange overlying said marginal perforations; windows formed through said flange in register with certain of said marginal perforations; lead lines extending between some of the perforations through the panel, each comprising a series of holes through the panel; illuminating means carried by the support to project light through all unobstructed perforations in the panel; and an auxiliary strip having orifices therethrough movable to and from position between said flange and margin of the panel whereby to further select the windows to be utilized for the passage of light from said illuminating means and thereby indicate a certain group of parts on the vehicle that are to be serviced.

In testimony whereof I hereunto affix my signature.

DAVID L. CONKLIN.